US011079070B2

(12) United States Patent
Moser

(10) Patent No.: US 11,079,070 B2
(45) Date of Patent: Aug. 3, 2021

(54) CROSS-CONTAMINATION PREVENTION SYSTEM AND RELATED METHODS

(71) Applicant: Gary A. Moser, Janesville, WI (US)

(72) Inventor: Gary A. Moser, Janesville, WI (US)

( * ) Notice: Subject to any disclaimer, the term of this patent is extended or adjusted under 35 U.S.C. 154(b) by 508 days.

(21) Appl. No.: 15/886,326

(22) Filed: Feb. 1, 2018

(65) Prior Publication Data

US 2018/0216783 A1 Aug. 2, 2018

Related U.S. Application Data

(60) Provisional application No. 62/453,322, filed on Feb. 1, 2017.

(51) Int. Cl.
*F17C 7/02* (2006.01)
*F16B 5/02* (2006.01)
(Continued)

(52) U.S. Cl.
CPC .............. *F17C 7/02* (2013.01); *F16B 5/0275* (2013.01); *F16L 15/06* (2013.01); *F17C 6/00* (2013.01); *F17C 9/00* (2013.01); *F16B 37/16* (2013.01); *F16B 2033/025* (2013.01); *F17C 2201/0109* (2013.01); *F17C 2201/0119* (2013.01); *F17C 2201/032* (2013.01); *F17C 2201/035* (2013.01); *F17C 2201/054* (2013.01); *F17C 2201/058* (2013.01); *F17C 2205/018* (2013.01); *F17C 2205/03* (2013.01); *F17C 2205/0364* (2013.01);
(Continued)

(58) Field of Classification Search
CPC ...... F17C 7/02; F17C 9/00; F17C 6/00; F17C 2201/054; F17C 2201/035; F17C 2201/058; F17C 2201/0119; F17C 2201/0109; F17C 2201/032; F17C 2205/018; F17C 2205/0364; F17C 2205/0373; F17C 2205/03; F17C 2265/00; F17C 2265/06; F17C 2265/061; F17C 2270/0171; F17C 2270/0745; F17C 2225/0153; F17C 2221/01; F17C 2221/035; F17C 2227/0178; F17C 2227/041; F17C 2223/0153; F16B 5/0275; F16B 37/16; F16B 2033/025; F16L 15/06
See application file for complete search history.

(56) References Cited

U.S. PATENT DOCUMENTS 3,347,286 A * 10/1967 Smith ...................... B67D 7/58
141/39
3,731,718 A * 5/1973 Gramig ................... F16L 29/02
141/384

(Continued)

OTHER PUBLICATIONS

LP Gas magazine.com, Guyette, James, "Ammonia contamination episodes bring acute safety, operational risks", Jun. 15, 2015, 5 pp.

(Continued)

*Primary Examiner* — Nicolas A Arnett
(74) *Attorney, Agent, or Firm* — Fitch, Even, Tabin & Flannery LLP

(57) ABSTRACT

A method of transporting liquid petroleum gas (LPG) comprising coupling reverse thread fittings of a first tank to reverse thread fittings of a second tank, the first tank storing the LPG; and allowing the LPG to flow from the first tank to the second tank through the reverse thread fittings of the first tank and the reverse thread fittings of the second tank.

5 Claims, 7 Drawing Sheets

(51) Int. Cl.
*F16L 15/06* (2006.01)
*F17C 9/00* (2006.01)
*F17C 6/00* (2006.01)
*F16B 37/16* (2006.01)
*F16B 33/02* (2006.01)

(52) U.S. Cl.
CPC .. *F17C 2205/0373* (2013.01); *F17C 2221/01* (2013.01); *F17C 2221/035* (2013.01); *F17C 2223/0153* (2013.01); *F17C 2223/033* (2013.01); *F17C 2225/0153* (2013.01); *F17C 2225/033* (2013.01); *F17C 2227/0178* (2013.01); *F17C 2227/041* (2013.01); *F17C 2260/056* (2013.01); *F17C 2265/00* (2013.01); *F17C 2265/06* (2013.01); *F17C 2265/061* (2013.01); *F17C 2270/0134* (2013.01); *F17C 2270/0171* (2013.01); *F17C 2270/0745* (2013.01)

(56) References Cited

U.S. PATENT DOCUMENTS

| | | | | |
|---|---|---|---|---|
| 4,088,436 A | * | 5/1978 | Alferes | F16L 37/23 137/517 |
| 5,119,844 A | * | 6/1992 | Cannon | F17C 13/002 137/355.16 |
| 5,992,438 A | * | 11/1999 | Shaw | F16K 1/307 137/14 |
| 6,209,562 B1 | * | 4/2001 | Shaw | F17C 13/025 137/15.18 |
| 2004/0187957 A1 | * | 9/2004 | Scheeter, Jr. | F17C 7/02 141/86 |
| 2011/0036421 A1 | * | 2/2011 | Minnella | B65D 90/22 137/382 |
| 2014/0238529 A1 | * | 8/2014 | Komuniecki | B60K 15/07 141/1 |
| 2015/0204467 A1 | * | 7/2015 | Cavagna | F17C 5/02 29/456 |
| 2017/0241593 A1 | * | 8/2017 | Koch | F04F 5/46 |
| 2017/0283240 A1 | * | 10/2017 | Wruck | B60P 3/225 |

OTHER PUBLICATIONS

Missouri Proppane Safety Commission, Educational Materials, "Anyhdrous Ammonia Contamination in Propane—Operator training", Feb. 23, 2012, 1 p.
National Propane Gas Association—Anhydrous Ammonia Safety Alert, "Anhydrous ammonia and propane cylinders", Aug. 4, 2007, 2 pp.
www.chem.info, The Associated Press, "Agriculture Commissioner Calls Ammonia Regulations Onerous", Sep. 11, 2015, 5 pp.
www.concoa.com, CGA Connection Reference Chart, Mar. 29, 2009, 5 pp.

* cited by examiner

CROSS-CONTAMINATION PREVENTION SYSTEM AND RELATED METHODS

CROSS REFERENCE TO RELATED APPLICATION

This application claims the benefit of U.S. Provisional Application No. 62/453,322, filed Feb. 1, 2017, which is hereby incorporated herein in its entirety.

FIELD

This invention relates generally to the storage and transport of compressed gases and, more particularly, to a system for preventing cross contamination between ammonia and propane systems.

BACKGROUND

Liquid petroleum gas ("propane" or "LPG") and anhydrous ammonia ("ammonia" or "NH3") share similar vapor characteristics and are shipped and stored at similar pressures. As a result, the equipment used to ship and store LPG and ammonia is very similar. However, ammonia in the presence of LPG is very corrosive, and can damage brass and copper fittings. The cross-contamination of gasses can increase the hazards posed by the equipment used to ship and store such gasses (e.g. increased fire hazards, increased risk of adverse chemical interactions, etc.).

A single cross-contamination upstream in the distribution chain can go undetected until it is delivered to the end user. In that time, the contaminated ammonia may be spread across several tanks resulting in millions of dollars' worth of property damage as every tank will need every brass or copper fitting replaced and a thorough cleaning.

If a damaged fitting fails, it can cause additional property damage as well as pose a threat to people. The release of pressurized, flammable gas can cause fire and/or explosions which can lead to burns or severe injuries. Small leaks in poorly ventilated areas can cause eye and respiratory irritation or more serious conditions, even death, if inhaled for an extended period of time.

In addition to accidental cross-contamination, the interchangeability of LPG and ammonia equipment enables commonly available LPG tanks to be utilized in the stealing of ammonia. Ammonia is used in the manufacturing of illegal substances, specifically methamphetamine. As such it has become common for individuals involved in the manufacturing of methamphetamines to steal ammonia using small household propane tanks, such as those used with a propane grill.

Accordingly, it has been determined that the need exists for an improved system of storing and transporting ammonia and methods relating to same.

BRIEF DESCRIPTION OF THE FIGURES

Embodiments of the invention are illustrated in the figures of the accompanying drawings in which.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Many variations of ammonia and LPG distribution systems, parts for same (e.g., trucks, tanks, fittings), and methods of avoiding cross-contamination are discussed herein and even further are contemplated in view of this disclosure. In one form, fittings are used at all levels of LPG distribution which are incompatible with the standard fittings used in the distribution of ammonia. In a more specific example, fittings used in the distribution of LPG are supplied with left hand or reverse threading so as to be incompatible with standard right hand thread ammonia fittings.

Figure 1:
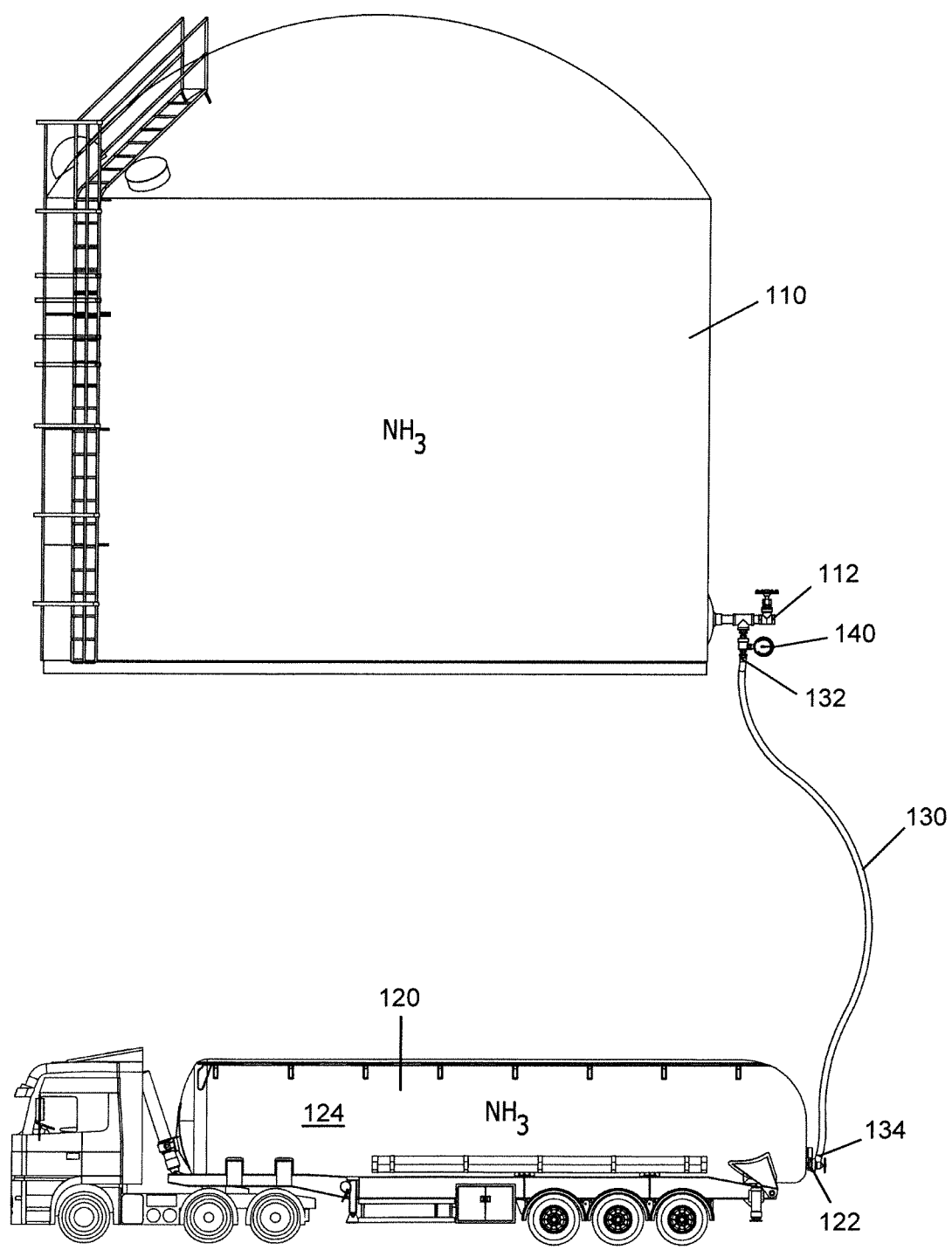
FIG. 1 illustrates an ammonia tanker truck being filled from an ammonia tank at an ammonia plant.

FIGS. 1-5 illustrate the distribution chain of compressed gasses, specifically LPG and ammonia. Before distribution, the gas is stored in a large storage tank 110. These large storage tanks may be located at the location at which the gas is produced (e.g., ammonia plant, oil refinery, natural gas processing plant, etc.) or may be positioned along pipelines. Storage tanks 110 include fittings 112 through which compressed gas can be removed from and/or added to the tank 110. The tank 110 in FIG. 1 is an anhydrous ammonia ("NH$_3$") storage tank. However, the tank 110 operates in substantially the same way as storage tanks for other compressed gasses, including liquid petroleum gas ("propane" or "LPG").

Large transports, such as the tanker truck 120 remove compressed gas from the tank 110 and deliver it to other locations. The tanker truck 120 has its own set of fittings 122 through which compressed gas can be added to or removed from the tanker truck tank 124. A hose 130 connects the tanker truck tank 124 to the storage tank 110. The first end of the hose 130 has a first fitting 132 configured to couple with the fittings 112 of the storage tank 110. The second end of the hose 130 has a second set of fittings 134 configured to couple with the fittings 122 of the tanker truck 120. In some forms, a pressure regulator 140 positioned somewhere between the storage tank 110 and the tanker truck 120 enables the higher pressure storage tank 110 to fill the tanker truck tank 124 to a predetermined pressure. The truck tank 124 generally is marked to indicate what gas it is configured to transport, e.g., "NH3" or "LPG".

Figure 2:
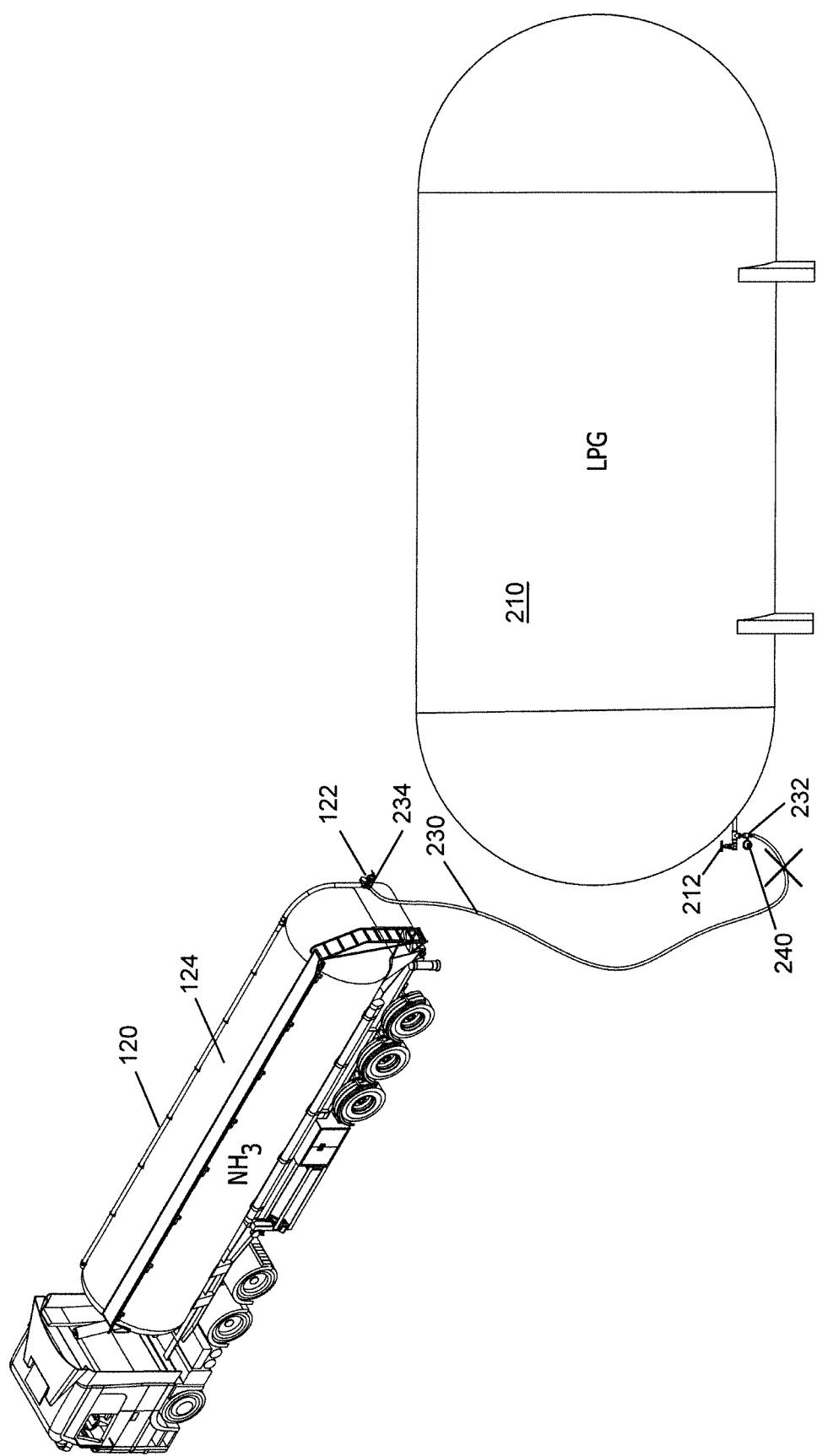
FIG. 2 illustrates the ammonia tanker truck of FIG. 1 filling an LPG tank at a distribution center.

The tanker truck 120 is used to fill large tanks 210 at distribution centers as shown in FIG. 2. As with above, the large tanks 210 used to store LPG are substantially similar to those used to store ammonia. As a result, ammonia tanker trucks 120 are sometimes inadvertently connected to LPG tanks 210, or vice versa, which causes cross-contamination.

Figure 3:
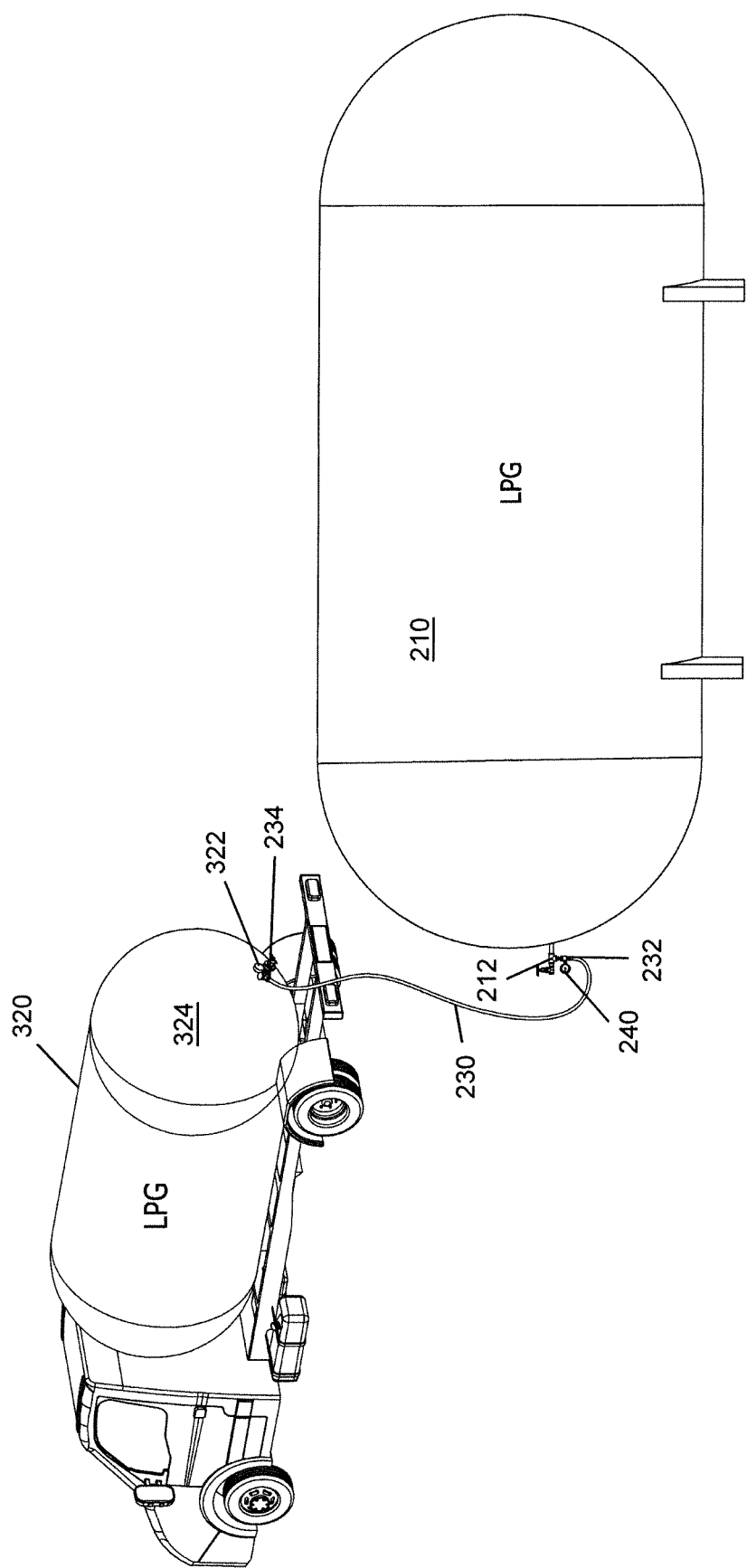
FIG. 3 illustrates a bobtail LPG truck being filled from the ammonia filled LPG tank of FIG. 2.

Bobtail trucks 320 are smaller tank trucks which are used for shorter range compressed gas delivery, and frequently delivery to end users. Bobtail trucks 320 have a tank 324 with fittings 322. The fittings 322 connect via a hose to tanks in order to allow gas to flow between the truck's tank 324 and the tank to which it is connected. In FIG. 3, a bobtail truck 320 connects to the LPG tank 210 of FIG. 2. If the tank 210 was previously contaminated with ammonia by the ammonia truck 110, the ammonia flows from the tank 210 into the bobtail truck 320 contaminating it.

Figure 4:
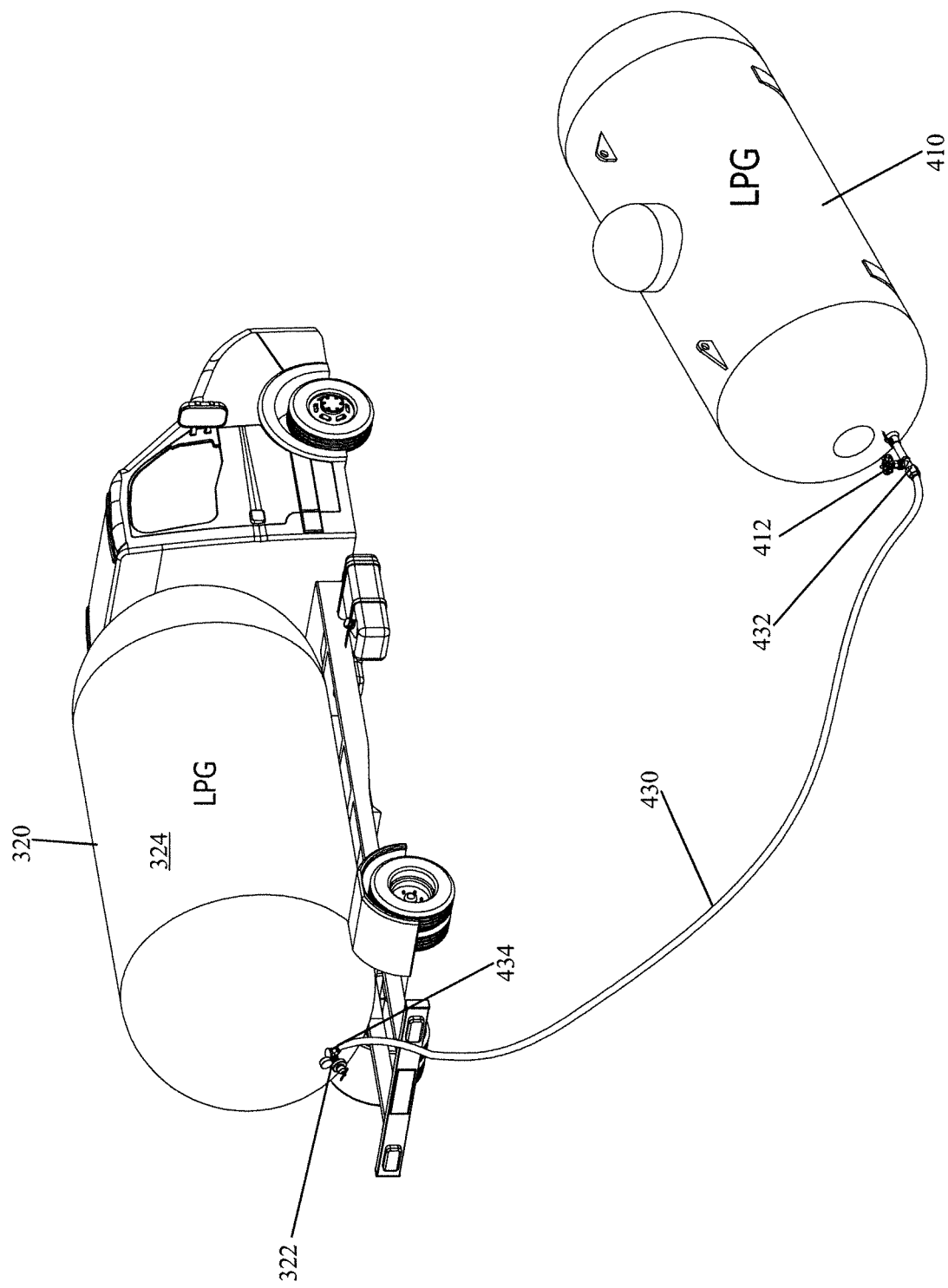
FIG. 4 illustrates the bobtail truck of FIG. 3 filling a larger LPG tank.
Figure 5:
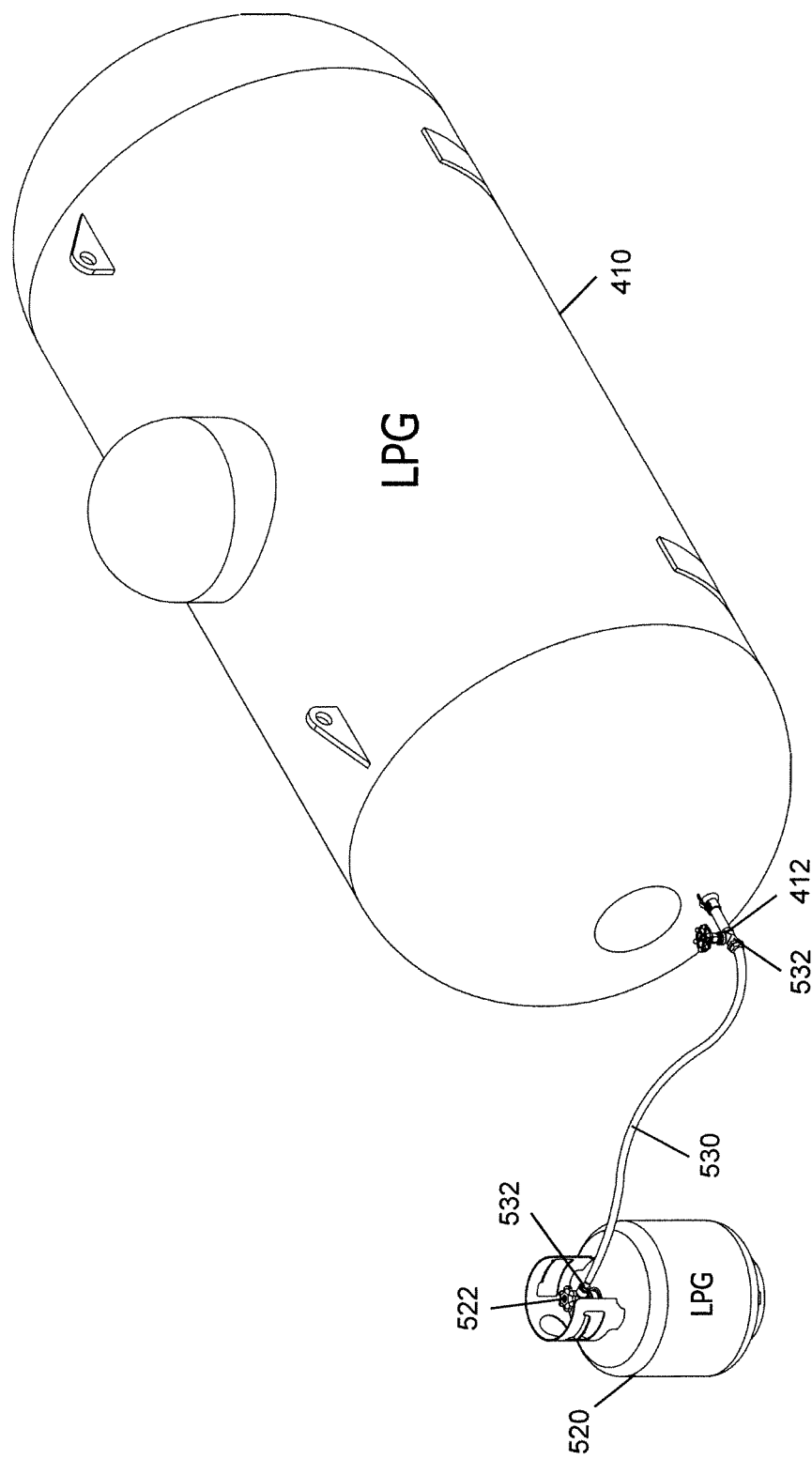
FIG. 5 illustrates a smaller LPG tank (e.g., transportable consumer propane storage cylinders or bottles) being filled by the LPG tank of FIG. 4.

A large tank 210 may hold enough compressed gas to supply an entire region, and connect to several bobtail trucks 320 to deliver that gas. Thus, contamination of a single large tank 210 in turn contaminates a plurality of bobtail trucks 320. Each bobtail truck 320 in turn delivers to smaller, end-user tanks 410 as shown in FIG. 4. In some operations, these end-user tanks 410 are not actually tanks used by the end users but rather tanks 410 used at retail locations to fill small personal tanks 520 as shown in FIG. 5. Tank 520 in FIG. 5 is a transportable consumer propane storage cylinder or bottle, which can range from small green colored 16.4 oz single use cylinders to bulk refillable five to twenty (5-20) gallon cylinders plus/minus five gallons (±5 5 gal.). The most common of such cylinders being a standard grill propane tank which is a five gallon/twenty pound cylinder (5 gal./20 lbs). Actual capacity of such cylinders is normally 4.7 gal./18 lbs. Other exemplary sizes include 7.1 gal./24 lbs. cylinders, 9.4 gal./29 lbs. cylinders, 23.6 gal./68 lbs. cylinders.

Through this distribution chain, the ammonia inadvertently transferred to the large tank 210 in FIG. 2 was spread to a plurality of bobtail trucks 320, each of which in turn spread it to a plurality of smaller tanks 410, which then each spread the ammonia to a plurality of personal tanks 520. Through this chain, the contamination can spread over a large area to affect several users and contaminate millions of dollars' worth of equipment in a short time span.

LPG tanks frequently have brass fittings. Ammonia causes these brass fittings to corrode. Overtime this, corrosion weakens the brass fittings to the point of cracking. A cracked fitting on a compressed gas tank can cause the slow release of the contained gas, such as the flammable LPG. In addition to the loss of the value of the LPG, this released gas can ignite if it comes in contact with a spark or open flame. In addition to the risk of a slow gas leak, cracked fittings can also cause an explosive gas leak. The high pressure gas can cause the crack to expand and exit the ensuing rupture with enough force to damage surrounding items or persons.

In addition to inadvertent contamination risk, there is also intentional use of LPG tanks to transport ammonia or vice versa. Ammonia is used in the manufacture of illegal narcotics, such as methamphetamines. Readily available LPG tanks are frequently used to steal ammonia for this purpose. Additionally, due to the interchangeable fittings a less sophisticated user may intentionally use an LPG or ammonia tank they believe to be empty to store the other compressed gas rather than incur the cost of cleaning the tank or purchasing a new tank.

Figure 6A:
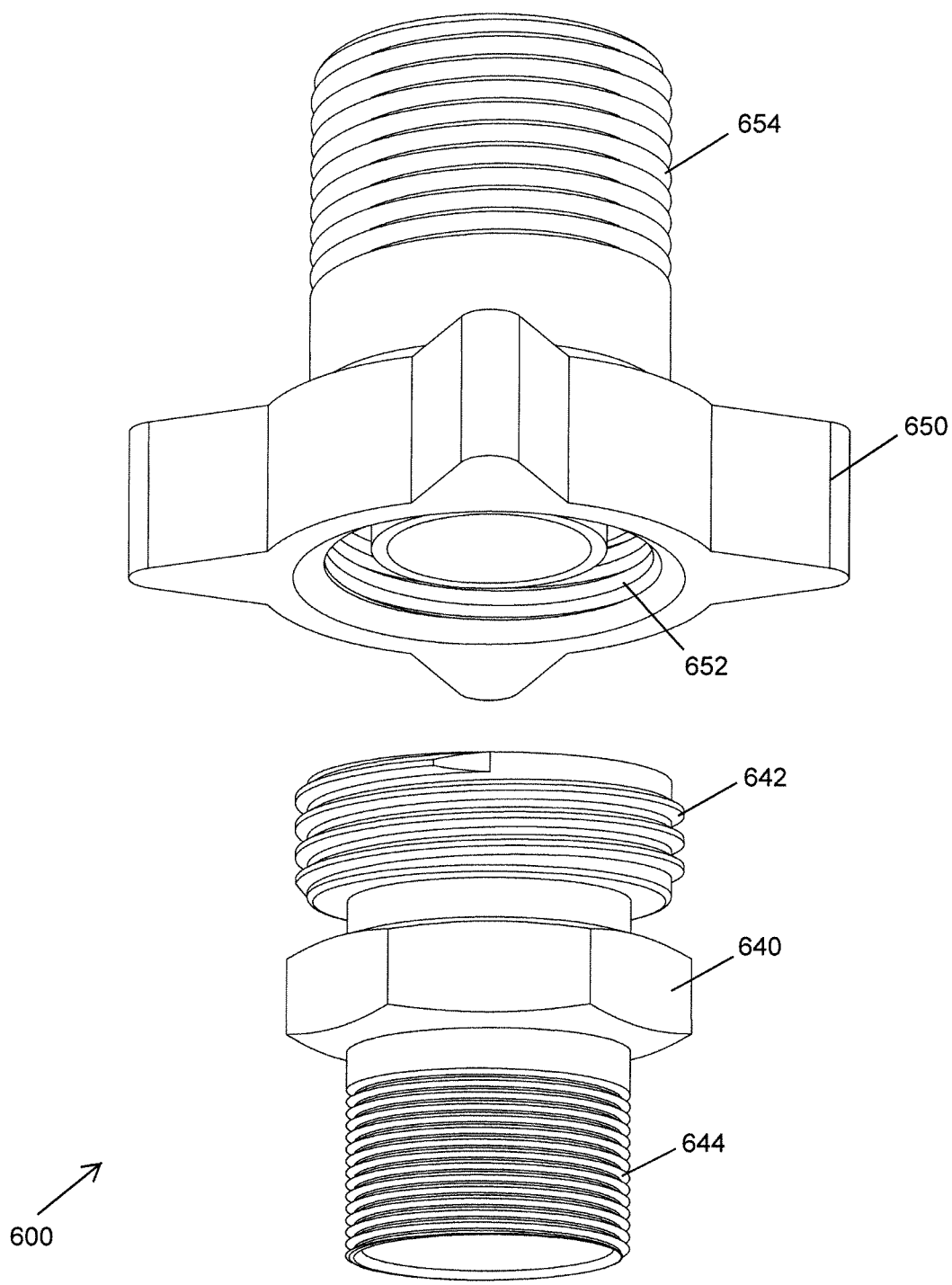
FIG. 6A is a perspective view of male and female acme fittings according to a first embodiment.

FIG. 6A illustrates standard thread acme fittings 600 as frequently used in the fittings for compressed gas distribution. The same size and type of threads are frequently used for both LPG and ammonia uses. The fittings 600 include a male fitting 640 and a female fitting 650. The male fitting include male acme threads 642 and male national pipe threads (NPT) 644. The female fitting 650 includes female acme threads 652 and male NPT 654. The NPT 644/654 are used for the more long term connections, such as connecting the fitting to the hoses or tanks described above. The coarser acme threads 642/652 are used for quicker coupling, such as connecting the tanks 110/210/410 to the trucks 120/320.

Figure 6B:
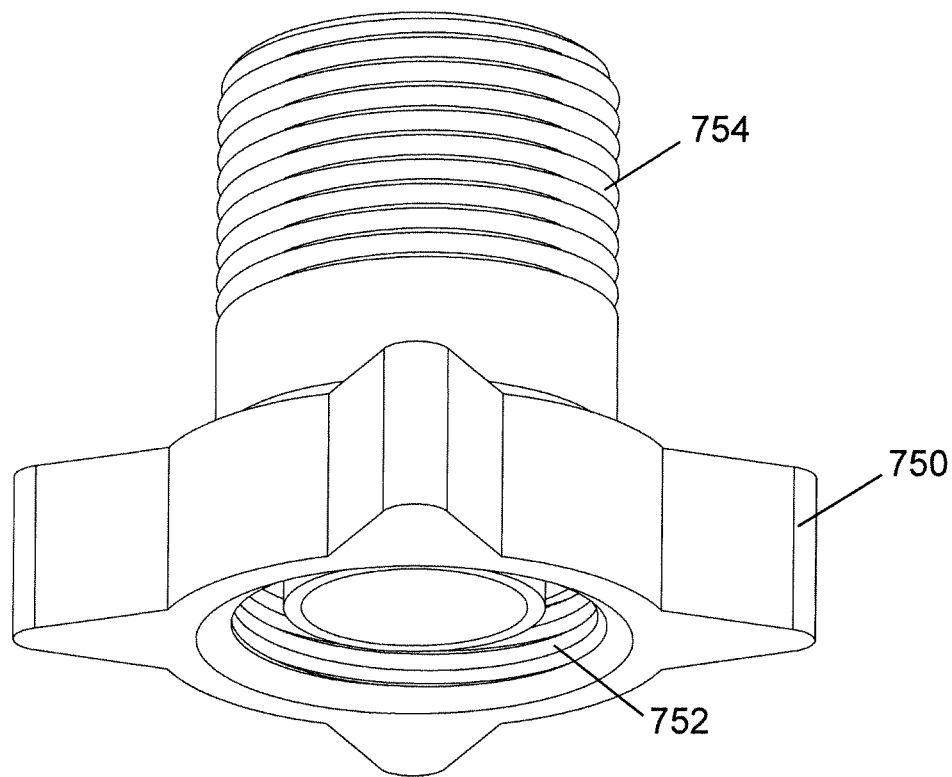
FIG. 6B is a perspective view of male and female acme fittings according to a second embodiment.
Figure 6B:
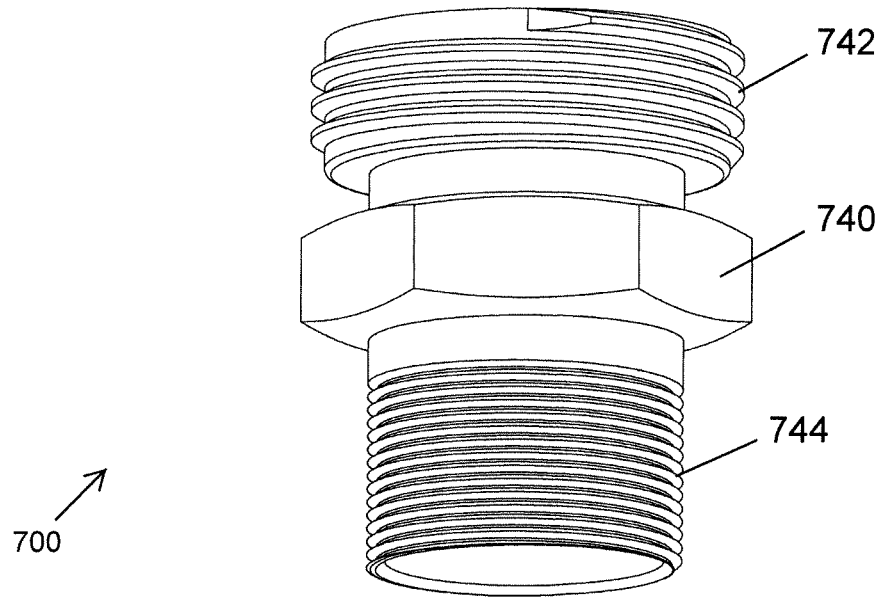

FIG. 6B illustrates reverse threaded acme fittings 700. There is a male fitting 740 and a female fitting 750. Similar to the standard threaded fittings, the male and female fittings 740/750 each include a standard male NPT side 744/754 for connecting the fittings 700 to tanks or hoses. The male fitting 740 include reverse male acme threads 742. The female fitting includes reverse female acme threads 752. The reverse male acme threads 742 and reverse female acme threads 752 can be quickly coupled to each other in order to connect the tanks to the trucks as described above. However, the reverse threaded fittings 740/750 cannot couple to the standard threaded fittings 640/650.

Replacing all of the fittings for use in LPG distribution with the reverse threaded fittings 740/750 while leaving all of the fittings for use in ammonia distribution as standard threaded fittings 640/650 reduces the instances of cross contamination. When the trucks and tanks cannot connect, it signifies to the user that the truck and tank are not for the same use. Either a different truck or tank is needed to be used, or the existing one would need to be cleaned out and refit with proper fittings. In alternative embodiments, the reverse threaded fittings are used for ammonia while the standard threaded fittings are used for LPG. So long as all of the fittings for one type of compressed gas are compatible with each other but not compatible with the fittings for use with the other type of compressed gas. In still further alternatives, a different change is made to the fittings to make the incompatible with each other. For example, the ammonia fittings can have a different diameter or different pitch than the LPG fittings.

Below is a table of hose coupling fittings currently used in the transport and storage of LPG and ammonia compressed gas. The fittings include both a "hose connection" which corresponds to the NPT connection on fittings 600/700 and a coupling connection which corresponds to the acme connections on fittings 600/700.

TABLE 1

Hose Couplings

| Material | Style | Hose Con. | Coupling Con. | Tailpiece Bore | Hose End to Nut | Length |
|---|---|---|---|---|---|---|
| Brass nut, steel nipple | B | 2" | 3¼" | 1¹³⁄₁₆" | 2⅛" | 3⅝" |
| Steel | A | 1¼" | 2¼" | 1³⁄₁₆" | 2⅛" | 3⅛" |
| Steel | B | 2" | 3¼" | 1¹³⁄₁₆" | 2⅛" | 3⅝" |

Below is a table of chain & ring plugs commonly used to plug the acme fittings when not coupled for transferring gas. These are commonly used for both LPG and ammonia applications.

TABLE 2

Chain and Ring Plugs

| Material | Male Acme Thread | Ring Fits Pipe Up To |
|---|---|---|
| Nylon | 1¾" | 1¼" |
| Nylon | 2¼" | 1¼" |
| Nylon | 3¼" | 2" |

Below is a table of chain & ring caps commonly used to plug the acme fittings when not coupled for transferring gas. These are commonly used for both LPG and ammonia applications.

TABLE 3

Chain and Ring Caps

| Material | Female Acme Thread | Ring Fits Pipe Up To |
|---|---|---|
| Brass | 1¾" | 1¼" |
| Brass | 2¼" | 2" |
| Brass | 3¼" | 3" |
| Steel | 2¼" | 2" |
| Steel | 3¼" | 3" |

Below is a table of acme to NPT adaptors commonly used in the storage and transportation of LPG and ammonia. In the table, M indicates male threads and F indicates female threads.

TABLE 4

Acme to NPT Adaptors

| Material | Acme | NPT |
|---|---|---|
| Brass | M 1¾" | M 1¼" |
| Brass | M 2¼" | M 1½" |
| Brass | M 2¼" | M 2" |
| Brass | M 3¼" | M 2" |
| Brass | M 3¼" | M 2½" |
| Brass | M 3¼" | M 3" |
| Steel | M 1¾" | M 1¼" |
| Steel | M 2¼" | M 1¼" |
| Steel | M 3¼" | M 2" |
| Steel | M 3¼" | M 3" |
| Steel | M 3¼" | F 2" |

The fittings described in the tables above are merely common examples of fittings used in the storage and transportation of LPG and ammonia. Other size fittings for use in the transport of LPG and ammonia are contemplated herein. For use with LPG, the acme threads in the listed fittings are reverse threads as in the fittings 700 shown in FIG. 6B. For use with ammonia, the acme threads in the listed fittings are standard threads as in fittings 600 in FIG. 6A.

Each element in the above drawings has a three digit reference number. The first digit refers to the embodiment while the last two digits refer to the element. Unless expressly distinguished, elements with the same last two digits are presumed to have substantially the same description. For example, hoses 230, 430, and 530 each have two sets of fittings 232/234, 432/434, and 532/534 substantially similar to hose 130 (although the size of the fittings may vary from hose to hose).

In a preferred embodiment, the LPG fitting comprise reverse threads as described above. Implementing reverse threads into LPG distribution systems should be easier as reverse threads are already used in the LPG field in POL fitting designed to connect the small personal tanks to household uses (such as grills). In alternative embodiments, the ammonia distribution system can utilize reverse threads while the LPG distribution system utilizes standard threads. In still further embodiments, the threads of the two distribution systems differ in some manner other than reverse vs. standard. For example, one type of gas utilizes coarse threads and the other fine, one type of gas utilizes metric threads and the other standard, the two gasses have different diameter fittings, etc.

While the above disclosure has focused on propane LPG, it should be understood to one of ordinary skill in the art that liquid petroleum gas or liquefied petroleum gas (LPG or LP gas) may refer to several types of gases including, for example, propane, butane, propylene, butadiene, butylene, isobutylene and mixtures thereof or other hydrocarbon gas mixtures. In a preferred form, the invention disclosure herein is intended to prevent cross-contamination of propane and anhydrous ammonia. However, in other forms, the fittings described herein may be used to help prevent cross-contamination between other gases. For example, in some forms, it may be implemented to prevent cross-contamination between ammonia and another type of LPG (e.g., butane, propylene, butadiene, butylene, isobutylene or mixtures thereof). In still other forms, it may be used to prevent cross-contamination of completely different liquids or gases.

Similarly, while the above references a preferred embodiment using Imperial ACME threading (e.g., standard Acme thread pitches for diameters in Imperial and US customary units), in alternate versions comparable international threading may alternatively be used (e.g. standard thread pitches for metric diameters, etc.). The following being tables of these thread pitches:

Standard Acme thread pitches for diameters in Imperial and US customary units

| Nominal Diameter (inches) | Pitch (inches) | Thread Density (1/inch) |
|---|---|---|
| ¼ | 1/16 | 16 |
| 5/16 | 1/14 | 14 |
| 3/8 | 1/12 | 12 |
| ½ | 1/10 | 10 |
| 5/8 | 1/8 | 8 |
| ¾, 7/8 | 1/6 | 6 |
| 1, 1¼ | 1/5 | 5 |
| 1½, 1¾, 2 | ¼ | 4 |
| 2½ | ⅓ | 3 |
| 3 | ½ | 2 |

Standard International thread pitches for diameters in Metric units

| Nominal Diameter (mm) | Pitch (mm) |
|---|---|
| 10 | 2 |
| 12 | 3 |
| 14, 16 | 4 |
| 24, 28 | 5 |
| 32, 36 | 6 |
| 40, 44 | 7 |
| 48, 52 | 8 |
| 60 | 9 |
| 70, 80 | 10 |
| 90, 100 | 12 |

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however, essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

In addition to the fittings and assemblies described herein (e.g. trucks or tanks using the described fitting), numerous methods are contemplated herein. These methods include methods of making and using the described fittings and assemblies, methods of storing and transporting compressed gas using the described fittings and assemblies, and methods of retrofitting existing tanks and trucks with the described fittings.

The invention claimed is:

1. A method of transporting liquid petroleum gas (LPG) comprising:
   coupling reverse thread fittings of a first tank to reverse thread fittings of a second tank, the first tank storing the LPG; and
   allowing the LPG to flow from the first tank to the second tank through the reverse thread fittings of the first tank and the reverse thread fittings of the second tank.

2. The method of claim 1, wherein the second tank is mounted to a truck.

3. The method of claim 1, wherein the reverse thread fittings of the first tank are reverse thread acme fittings.

4. The method of claim 1 further comprising:
   decoupling the reverse thread fittings of the second tank from the reverse thread fittings of the first tank;
   moving the second tank; and
   coupling the reverse thread fittings of the second tank to reverse thread fittings of a third tank.

5. The method of claim 1, wherein the reverse thread fittings of the first tank storing the LPG are different than the thread type of a fitting of a fourth tank storing anhydrous ammonia.

* * * * *